Jan. 30, 1968   F. S. BOYER   3,366,267
PLUG FOR HOLES IN SHEET METAL BOXES AND THE LIKE
Filed Oct. 24, 1965
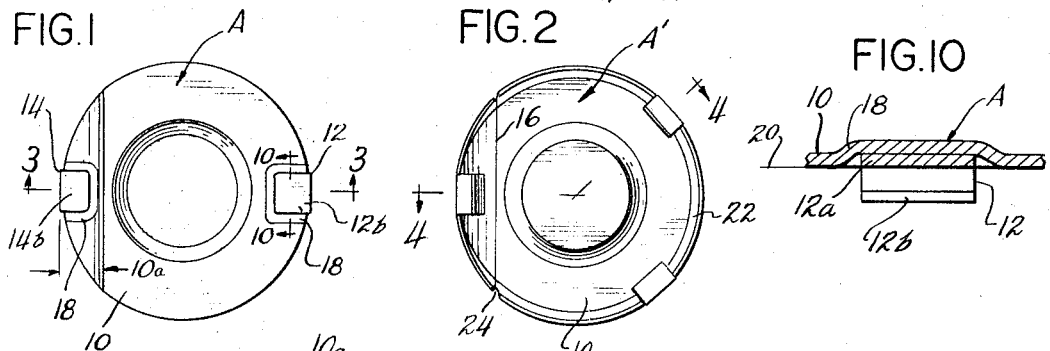
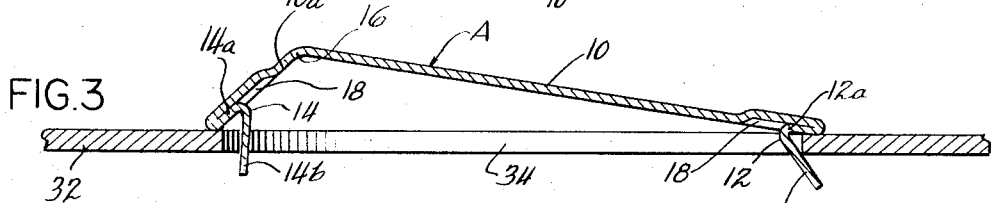
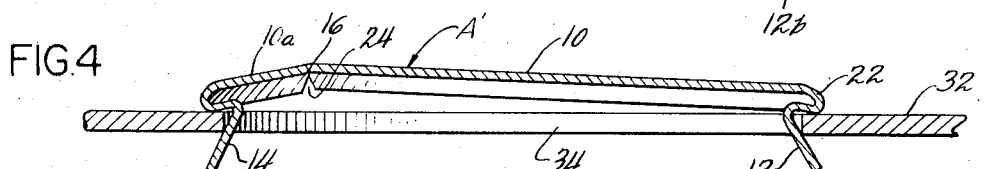
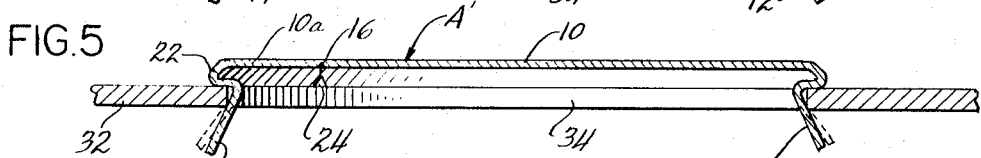
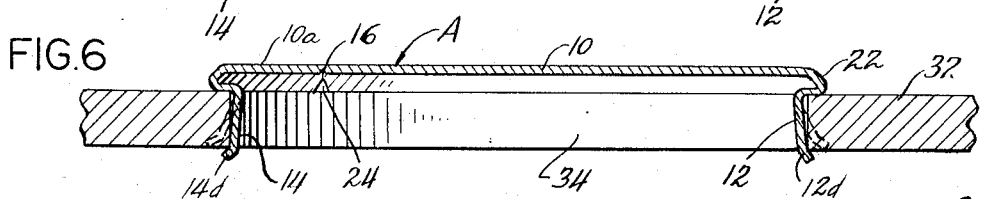
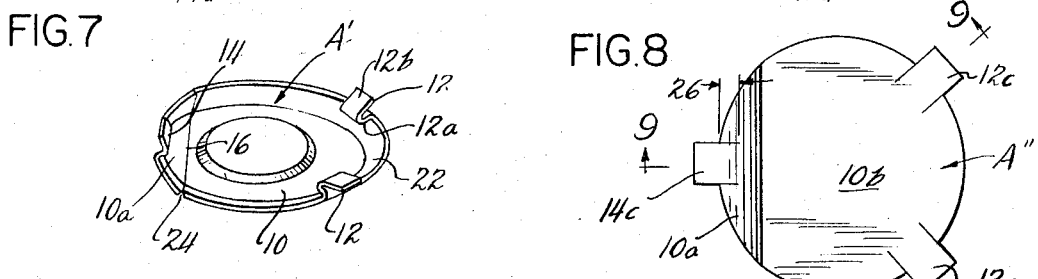
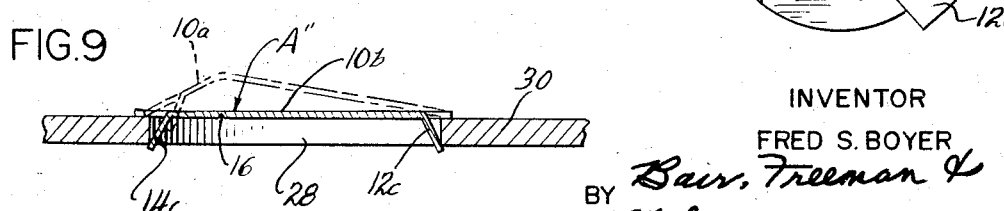
INVENTOR
FRED S. BOYER
BY Bair, Freeman &
Molinare ATTORNEYS

# United States Patent Office 3,366,267
Patented Jan. 30, 1968

3,366,267
PLUG FOR HOLES IN SHEET METAL BOXES AND THE LIKE
Fred S. Boyer, 5638 N. Kostner, Chicago, Ill. 60646
Filed Oct. 24, 1965, Ser. No. 504,690
3 Claims. (Cl. 220—27)

ABSTRACT OF THE DISCLOSURE

A sheet metal plug for holes in sheet metal boxes such as conduit holes in electrical junction boxes, sheet metal cabinets, sheet metal wiring troughs and the like. The plug covers the hole in the box and has a plurality of tabs at its edge to be dropped through the hole. The plug has a bend which is so positioned relative to the span of the plug that when the plug is pressed or hammered to straighten out the bend, the tabs will hook on the inside of the box and positively retain the plug in position without snap-in operation, yet can be removed by prying it out of the hole if the hole is to be later used. The plug and its tabs are so designed as to fit a wide range of hole sizes, yet the tabs effectively coact with the edge of the hole in the box to retain the plug in position completely covering the hole when the plug is installed.

---

This invention relates to a plug for holes in sheet metal boxes such as conduit holes in electrical junction boxes. The proposed plug may be installed simply by inserting tabs of the plug in the hole to be plugged, and then pressing on a disc-like body of the plug until it is in contact with the outer surface of the wall of the box, the tabs thereupon retaining the plug in the installed position and the disc-like body serving as a seal against entrance of dust and other foreign matter as required by electrical codes. These plugs may be made in several sizes to fit various standard conduit hole sizes, and also holes of various sizes in other types of sheet metal boxes. Where the holes are other than round in shape, the plugs may be formed in shapes similar to the hole shapes.

Presently available plugs for this purpose are not entirely satisfactory. They are constructed to snap into the so-called standard-sized holes in splicing boxes with a spring grip. However, the standard-sized holes vary in diameter between the various manufacturers of electrical splicing boxes and control enclosures. The device of the present invention is designed to hook, tightly and quickly, into secure position in spite of minor variations in hole size and thickness of the material of which the boxes are made.

One object of the invention is to provide a plug of the character disclosed which is comparatively simple and inexpensive to manufacture.

Another object is to provide a plug which may be installed by pressing as above described, or by hammering the plug toward the box wall once the tabs of the plug have been inserted in the hole of the wall.

Still another object is to provide terminal ends of the tabs divergently inclined away from the disc-like body of the plug when the plug is in installed position, these terminal ends however being a distance apart less than the diameter of the hole before installation to permit insertion into the hole, and a greater distance apart after installation so as to retain the plug in installed position.

A further object is to provide an arrangement of tabs which permits subsequent easy removal of the plug if it is necessary to again make the hole available, the construction being such that a screwdriver can be inserted between the disc and the wall of the box and the disc pried away from the box wall whereupon the tabs can again be operated for retaining the plug in a subsequent hole by again pressing the disc toward the wall of the box in a manner similar to the initial installation.

Still a further object is to provide a plug element of greater size than a hole to be plugged, the element having a bent-down portion which may be straightened to increase the distance apart of retaining tabs at the periphery of the element so that they overhang the inner edge of a hole to be plugged when the device is in installed position.

A still further object is to provide a plug element in which the extreme ends of the retaining tabs are bent slightly outwardly so as to hook securely under the edge of the hole regardless of the thickness of the material from which the box is made.

With these and other objects in view, my invention consists in the construction, arrangement and combination of the various parts of my plug for holes in sheet metal boxes and the like, whereby the objects above contemplated are attained, as hereinafter more fully set forth, pointed out in my claims and illustrated in detail on the accompanying drawing, wherein:

FIG. 1 is a plan view of a stamped, sheet metal, flat type plug (approximately twice actual size for a ⅞ inch conduit hole in an electrical junction box) as completely formed;

FIG. 2 is a bottom plan view of a similar but cupped type of plug showing three tabs instead of two;

FIG. 3 is an enlarged sectional view on the line 3—3 of FIG. 1 showing the plug partially installed with opposite portions of its periphery resting in position on the wall of a box;

FIG. 4 is a similar sectional view on the line 4—4 of FIG. 2 showing an intermediate step of the installation procedure;

FIG. 5 is a sectional view similar to FIG. 4 showing the plug fully installed;

FIG. 6 is a sectional view similar to FIG. 5 showing the plug installed in a wall of greater thickness, with a further modification for such installation;

FIG. 7 is a bottom perspective view of the plug shown in FIGS. 2, 4, 5 and 6;

FIG. 8 is a plan view of a blank for a modified form of plug;

FIG. 9 is a sectional view on the line 9—9 of FIG. 8 showing the plug installed in a hole in the wall of a box, and FIG. 10 is a sectional view on the line 10—10 of FIG. 1.

On the accompanying drawing I have used the reference character A to indicate in general the plug of FIG. 1. A pair of peripherally located hook-like tabs 12 and 14 extend from opposite sides of a disc-like body portion 10 of the plug A and may be identified as first and second tabs, respectively. The disc 10 is slightly larger in size than the hole it is designed to plug. The tabs 12 and 14 have first portions 12ª and 14ª and second portions 12ᵇ and 14ᵇ as shown, for instance, in FIG. 3.

Adjacent the tab 14 a score line 16 is provided as shown in FIG. 3 in the inner face of the plug body 10 so that a minor portion 10ª of the body may initially be bent downwardly at an obtuse angle relative to the major portion thereof as illustrated. The score line lies on a chord of the circular disc. The portions 12ª and 14ª of the tabs 12 and 14 are folded under the marginal edges of the body portion 10 (FIG. 3) and the body portion may be embossed as shown at 18 (see FIG. 10) so that the body portion 10 may lay flat on a box surface indicated at 20 to avoid gaps around the periphery of a hole in the wall as will hereinafter appear that might permit the entrance of foreign material to a box such as a junction box or the like. The tab portions 12ᵇ and 14ᵇ are bent at approximately the angles shown in FIG. 3 for purposes which will hereinafter appear.

FIGS. 2, 4, 5, 6, and 7 show a modified form of plug A' in which two of the ears 12 instead of one are provided, the embossings 18 are omitted and the edge of the body 25 is cupped as indicated at 22. In this form of invention the score line 16 requires notches 24 at its ends to permit progressive bending from the initial position of FIG. 3 to the final position of FIG. 5.

In FIG. 8 I show another flat type of plug wherein the tabs are indicated 12ᶜ and 14ᶜ before they are bent as in FIG. 9. The body portion of the plug is indicated 10ᵇ and the edges of the tabs are slit into the body portion as indicated at 26 so that when the tabs are bent down as shown dotted in FIG. 9 the marginal peripheral edge of the disc 10ᵇ may overhang the edge of the hole 28 in a sheet metal wall 30 of a junction box or the like to seal out foreign material. The installed position of the plug of FIG. 8 is shown by solid lines in FIG. 9 and the installation procedure is substantially similar to that illustrated in FIGS. 3, 4 and 5 which will now be described in detail.

In the initial position of the plug as shown in FIG. 3 the tab portion 14ᵇ extends approximately at right angles from the plane of the disc 10 while the portion 10ᵃ of the disc is bent downwardly from the plane of the disc at an obtuse angle as shown. Accordingly, the plug may be easily inserted to the position shown in FIG. 3 with the tab portions 12ᵃ and 12ᵇ inserted in a hole 34 of a sheet metal box wall 32 whereupon the disc 10 may be pressed toward the box wall as shown in FIG. 4 where the plug is partially installed. The plug may then be pressed further to the position shown in FIG. 5 where it is fully installed. A hammer or the like may be used to aid in the pressing operation if desired.

By comparing FIG. 4 with FIG. 3, it will be noted that the portion 10ᵃ of the disc 10 is being bent into alignment with the major portion of the disc and that in FIG. 5 full alignment has been achieved whereupon a neat appearing plug results having the edge of the disc 10 overlapping the edge of the hole 34 to keep dirt and other foreign matter out of the junction box. With the type of plug shown in FIGS. 1 and 3 there is flat surface engagement such as illustrated in FIG. 9 for the type shown in FIG. 8, whereas with the type shown in FIGS. 2, 4, 5, 6 and 7 the cupped edge 22 contacts the surface of the box. At the same time the diverging tab portions 12ᵇ and 14ᵇ are so related to the diameter of the hole 34 that their terminal ends are a greater distance apart than such diameter and the tab portions are under slight tension (being bent from the dotted position shown in FIG. 5 to the solid line position) thereby retaining the plug in installed position. It may readily be removed, however, by inserting a screwdriver or the like under the edge of the disc 10 adjacent the scoring 16 and then prying up the edge of the disc as to the position shown in FIG. 4 and then on to the position shown in FIG. 3. The tabs 10 and 12 can then be withdrawn from the hole 34. Thereafter the plug may be reinserted in another hole to be plugged if desired.

FIG. 6 illustrates how the tab portions 12ᵇ and 14ᵇ may spring from the dotted position comparable to FIG. 5 in a thin walled box for a thick wall, or to accommodate and properly coact with a hole which is slightly smaller in diameter. Thus, the resiliency and angle of the tabs 12 and 14 effect proper installation of the plug with variations in hole sizes and wall thicknesses. The tabs 12 and 14 may be formed with additional outward bends, as at 12ᵈ and 14ᵈ, shown as a modification in FIG. 6. Such additional outward bends add to the hooking action of the tabs 12 and 14 when used with junction boxes having thicker walls.

In the modified form of plug shown in FIGS. 8 and 9 the slits 26 are required whereas in the form of FIGS. 1 and 2 the necessity of such slits is eliminated. The first seven figures of the drawing show the center of the disc 10 embossed for reinforcing purposes which may not be needed if the discs are made of thicker material. Both the two-tab type of FIG. 1 and the three-tab type of FIG. 2 operate in similar manner, the three-tab type being somewhat more stable because of a "three-point" connection of the plug with respect to the conduit hole. Also there is less likelihood of the plug slipping out of position during the installation process when three or more tabs are provided. It should also be understood that plugs made in the form of FIG. 1 may have both of its tabs alike. In such a construction each tab is of the form of tab 14, and each tab is associated with a bent minor portion 10ᵃ of the plug body 10. Plugs of the form of FIG. 2, having three or more tabs, may have two or more of those tabs of the form of tab 14, each associated with a similar minor bent portion 10ᵃ. With such a construction it is usually advantageous to space the tabs equidistantly from each other.

The cupped edge 22 of the disc 10 enhances the appearance of the plug and provides a more effective seal as between the plug and the wall of the junction box without the necessity of embossings 18 as shown in FIG. 10.

The portions 12ᵇ and 14ᵇ of the tabs 12 and 14 are designed to fit conduit holes in boxes made of thin sheet metal and also to "give" in holes of boxes made of thicker material or where the holes are slightly undersize in diameter. Holes in electrical conduit boxes vary in size slightly with the different manufacturers and this is also taken into consideration in designing the angle, shape, length and distance apart of the tab portions of the plug.

Some changes may be made in the construction and arrangement of the parts of my disclosed plug without departing from the real spirit and purpose of my invention, and it is my intention to cover by my claims any modified forms of structure or use of mechanical equivalent which may reasonably be included within their scope.

I claim as my invention:

1. In a plug for holes in sheet metal boxes or the like, a sheet metal circular disc of greater diameter than the hole to be plugged, said disc being divided into a major portion and a minor portion by a score line constituting a chord of said circle, said minor portion being disposed downwardly out of the plane of said disc and defining an obtuse angle with said major portion, a first hook-like tab depending from the periphery of said minor portion, a second similar tab depending from the periphery of said major portion, said tabs serving to lock the disc tightly to the marginal edge of the wall surrounding the hole in said metal box when said minor portion is bent back into the plane of said major portion after inserting said plug in the hole.

2. The plug of claim 1 in which said score line is imperforate.

3. The plug of claim 1 in which said disc is turned downwardly to provide a skirt around its entire circumference to engage said marginal edge of the wall.

References Cited

UNITED STATES PATENTS

| | | | |
|---|---|---|---|
| 2,097,173 | 10/1937 | Bazeley | 220—24 |
| 2,444,268 | 6/1948 | Peters | 220—27 |
| 3,278,066 | 10/1966 | George et al. | 220—23.4 |

THERON E. CONDON, *Primary Examiner.*

G. T. HALL, *Assistant Examiner.*